United States Patent [19]

Nakamura et al.

[11] Patent Number: 6,034,161

[45] Date of Patent: Mar. 7, 2000

[54] COLD-SETTING AQUEOUS EMULSION PAINT

[75] Inventors: Tetsuo Nakamura, Kanuma; Hiroharu Sasaki; Kazuyoshi Tsuneta, both of Nishinasuno-machi; Sadakazu Hokamura, Yamato, all of Japan

[73] Assignee: Dai Nippon Toryo Co., Ltd., Osaka, Japan

[21] Appl. No.: 09/088,710

[22] Filed: Jun. 2, 1998

[30] Foreign Application Priority Data

Jul. 17, 1997 [JP] Japan .................................. 9-192223

[51] Int. Cl.$^7$ ............................ C08K 3/22; C08K 3/34
[52] U.S. Cl. .................... 524/432; 524/437; 524/443; 524/450
[58] Field of Search ...................... 524/432, 443, 524/444, 451, 61 B; 526/316

[56] References Cited

U.S. PATENT DOCUMENTS

| | | |
|---|---|---|
| 4,530,945 | 7/1985 | Christenson et al. ............ 523/400 |
| 4,626,420 | 12/1986 | Usui et al. ....................... 423/326 |
| 5,155,173 | 10/1992 | Miura et al. ..................... 524/444 |
| 5,516,933 | 5/1996 | Fujiwa ............................. 560/178 |

FOREIGN PATENT DOCUMENTS

| | | |
|---|---|---|
| 0 650 954 | 5/1995 | European Pat. Off. . |
| 0 789 063 | 8/1997 | European Pat. Off. . |

*Primary Examiner*—Tae Yoon
*Attorney, Agent, or Firm*—Oblon, Spivak, McClelland, Maier & Neustadt, P.C.

[57] ABSTRACT

A cold-setting aqueous emulsion paint comprising a pigment and an aqueous emulsion resin consisting essentially of a copolymer of (a) a polymerizable monomer of the formula (I):

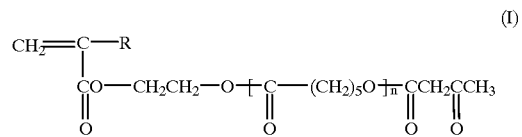

wherein R is a hydrogen atom or a methyl group, and n is 1 or 2, (b) a polymerizable monomer having a carboxyl group and an ethylenic double bond, and (c) a polymerizable monomer having an ethylenic double bond copolymerizable with the above polymerizable monomers (a) and (b).

8 Claims, No Drawings

COLD-SETTING AQUEOUS EMULSION PAINT

The present invention relates to a cold-setting aqueous emulsion paint. Particularly, it relates to an aqueous emulsion paint which is excellent in storage stability even though it contains a pigment having adsorptivity to contaminants such as tobacco tar, soot, dirt from the hands, lamp black and rain drip stain and which is capable of forming a coating free from bleeding of contaminants.

For coating a wall, ceiling or the like in a room of e.g. a building, a house or a vehicle, an aqueous emulsion paint is frequently used from the viewpoint of environmental sanitation or fire protection law. Further, at the time of refinishing the coating, such an inside wall or ceiling is stained, in many cases, with e.g. tobacco tar, soot, dirt from the hands, lamp black and rain drip stain, and it frequently occurs that such contaminants will bleed out at the time of coating for refinishing until the coating will dry up. Especially, contaminants such as tobacco tar, contain many water-soluble components, and if an aqueous anionic emulsion paint is coated for refinishing, bleeding out of contaminants tends to be remarkable. Therefore, when it is desired to finish with a white or pale color, it is difficult to use an aqueous paint, since a stain due to bleeding out of such contaminants becomes distinct, and it is obliged to use an organic solvent type paint. Otherwise, it will be necessary to preliminarily coat a cationic aqueous sealer and then coat thereon an aqueous anionic emulsion paint as a top coating material. Such is disadvantageous from the viewpoint of costs, as the number of coating steps thereby increases.

Further, JP-A-5-43821 discloses a setting system of an aqueous emulsion paint utilizing a reaction of a carbonyl group and a hydrazide group, but with such a setting system, bleeding out of contaminants can not adequately be suppressed, and the water resistance is not sufficient, since the cross linking reaction product of the hydrazide group undergoes hydrolysis. JP-A-5-59304, JP-A-5-59305, JP-A-6-207124 and JP-A-6-207125 disclose aqueous emulsion paints containing hydrotarsites, active alumina and/or activated clay (these are pigments having adsorptivity to contaminants), as pigment components. These paints are known to be paints which are free from bleeding out of contaminants, but they tend to be gelled and lack in storage stability, since the activities of the pigments are high. JP-A-8-104829 discloses a system employing as a setting mechanism a Michael addition reaction wherein active methylene groups are added to polarized double bonds such as α, β-unsaturated carbonyl groups. However, also such a system lacks in storage stability when the above mentioned adsorptive pigments are used.

The present invention has been made to solve such problems of the prior art, and it is an object of the present invention to provide an aqueous emulsion paint which is cold-setting and free from deterioration of storage stability even though it contains the above mentioned adsorptive pigment and which is capable of forming a coating free from bleeding out of the above mentioned contaminants.

The present inventors have conducted various studies to solve the above problems and as a result, have found it possible to provide an aqueous emulsion paint which is capable of setting by self-crosslinking at room temperature without incorporating a crosslinking agent and is excellent in storage stability even though the above mentioned adsorptive pigment is incorporated as a pigment and which is capable of forming a coating free from bleeding out of contaminants such as tobacco tar, soot, dirt from the hands, lamp black and rain drip stain, by using a copolymer comprising, as essential components, a polymerizable monomer consisting of an acetoacetyl group-containing (meth)acrylate having a certain specific structure and a polymerizable monomer having a carboxyl group and an ethylenic double bond, as a binder resin constituting the aqueous emulsion paint. The present invention has been accomplished on the basis of this discovery.

Namely, the present invention provides a cold-setting aqueous emulsion paint comprising a pigment and an aqueous emulsion resin consisting essentially of a copolymer of (a) a polymerizable monomer of the formula (I):

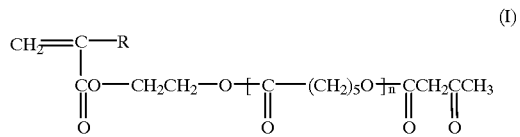

wherein R is a hydrogen atom or a methyl group, and n is 1 or 2, (b) a polymerizable monomer having a carboxyl group and an ethylenic double bond, and (c) a polymerizable monomer having an ethylenic double bond copolymerizable with the above polymerizable monomers (a) and (b).

Now, the present invention will be described in detail with reference to the preferred embodiments.

The aqueous emulsion paint of the present invention is a paint comprising an aqueous emulsion resin and a pigment as essential components.

The aqueous emulsion resin to be used in the present invention, is an aqueous emulsion resin containing a copolymer of a polymerizable monomer (a) which is a caprolactone-modified acetoacetoxy (meth)acrylate of the above formula (I), a polymerizable monomer (b) having a carboxyl group and an ethylenic double bond, and a polymerizable monomer (c) having an ethylenic double bond copolymerizable with the polymerizable monomers (a) and (b).

Typical commercial products of the above polymerizable monomer (a) include, for example, "Placsel ATFA1", "Placsel ATFA2", "Placsel ATFM1" and "Placsel ATFM2", tradenames, manufactured by Daicel Chemical Industry Co., Ltd.

The above polymerizable monomer (b) may, for example, be acrylic acid, methacrylic acid, maleic acid, fumaric acid or itaconic acid.

The above polymerizable monomer (c) may, for example, be a $C_{1-24}$ alkyl or cycloalkyl ester of (meth)acrylic acid, such as methyl acrylate, ethyl acrylate, propyl acrylate, butyl acrylate, hexyl acrylate, cyclohexyl acrylate, 2-ethylhexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, cyclohexyl methacrylate, 2-ethylhexyl methacrylate, octyl methacrylate, lauryl methacrylate or stearyl methacrylate; a $C_{1-18}$ alkoxyalkyl ester of (meth)acrylic acid, such as methoxybutyl acrylate, methoxybutyl methacrylate, methoxyethyl acrylate, methoxyethyl methacrylate, ethoxybutyl acrylate or ethoxybutyl methacrylate; a $C_{2-8}$ hydroxyalkyl ester of (meth)acrylic acid, such as hydroxyethyl acrylate, hydroxyethyl methacrylate, hydroxypropyl acrylate or hydroxypropyl methacrylate; an aromatic unsaturated monomer such as styrene, vinyl toluene, α-methyl styrene, N-vinyl pyrrolidone or vinyl pyridine; an olefin such as ethylene, propylene, butylene or pentene; a diene compound such as butadiene, isoprene or chloroprene; vinyl acetate, vinyl propionate, acrylonitrile, methacrylonitrile, vinyl pivalate or Beovamonomer (tradename, manufactured by Shell Japan Company). These monomers may be used alone or in combination as a mixture of two or more them.

With respect to the proportions of these monomers, the molar ratio [(a)/(b)] of the polymerizable monomer (a) to the polymerizable monomer (b) is usually from 0.1 to 10, preferably from 0.5 to 3, so that the resulting copolymer is capable of forming a three dimensional cross linked cured coating by self-crosslinking. Within this range, an adequate three dimensional crosslinked cured coating can be formed, whereby the effect for preventing bleeding out of contaminants will be large. The sum of the polymerizable monomers (a) and (b) is usually from 0.5 to 60 wt %, preferably from 1 to 10 wt %, in the entire monomers inclusive of the polymerizable monomer (c). if the sum of the polymerizable monomers (a) and (b) is less than 0.5 wt %, the effect for preventing bleeding out of contaminants tends to be low. On the other hand, if it exceeds 60 wt %, the viscosity of the paint tends to be high.

The aqueous emulsion resin to be used in the present invention, can be produced by a method wherein these polymerizable monomers are emulsion-polymerized in water in the presence of an emulsifier in accordance with a conventional method, or a method wherein these polymerizable monomers are subjected to solution polymerization in a hydrophilic organic solvent in accordance with a conventional method, then neutralized with a neutralizing agent such as ammonia, ethanol amine, diethanol amine, triethanol amine, triethyl amine, sodium hydroxide or potassium hydroxide, and then dispersed in water, and if necessary, the organic solvent is removed. The molecular weight of the emulsion resin is suitably from a few hundred thousands to a few million by a weight average molecular weight.

In the present invention, as the pigment, various color pigments or extender pigments may be used without any particular restriction, such as titanium oxide, iron oxide red, carbon black, calcium carbonate, barium carbonate, talc, clay, mica, alumina, alum, clay, magnesium hydroxide, magnesium oxide or diatomaceous earth.

The aqueous emulsion paint of the present invention an example of such a composition, $5ZnO.Al_2O_3.3SiO_2.5H_2O/4SiO_2$ may be mentioned.

The active zinc white is fine particles having a particle size of at most 0.2 μm, which is smaller than usual zinc white, and a specific surface area of from about 50 to 150 m²/g. As a commercial product, "Active Zinc White Azo", tradename, manufactured by Seidou Kagaku Kogyo K.K., is, for example, available.

As the magnesium silicate, a water-containing magnesium silicate represented by the chemical structural formula:

may be mentioned as a typical example, and it is fine particles having an average particle size of from about 1 to 20 μm. As a commercial product, "Kyoward 600", tradename, manufactured by Kyowa Chemical Industry Co., Ltd., or "Aidplus", tradename, manufactured by Mizusawa Kagaku Kogyo K.K., is, for example, available.

The aqueous emulsion paint of the present invention contains the above described aqueous emulsion resin, the pigment and water, and it may further contain various hydrophilic organic solvents such as methanol, ethanol, methylcellosolve and ethylene glycol, or various additives such as a neutralizing agent, a thickner, a defoaming agent, a film-forming assisting agent, a is excellent in storage stability despite it contains a pigment having adsorptivity to contaminants such as tobacco tar, soot, dirt from the hands, lamp black or rain drip stain. As such an adsorptive pigment, fraipontite, active zinc white and magnesium silicate are particularly suitable from the viewpoint of the adsorptivity and the storage stability of the paint.

The pigment is preferably incorporated in an amount such that the volume concentration (PVC) in the paint solid content would be at most 70%, preferably from 10 to 60%.

The fraipontite is typically represented by the following basic chemical structural formula:

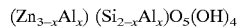

wherein x is from 0 to 1.75, preferably from 0.3 to 1.0. It has a fine laminated plate-like crystal structure with a composition as represented by oxides being from 5 to 45 mol % of $SiO_2$, from 35 to 65 mol % of ZnO and from 0 to 60 mol % of $Al_2O_3$. It is fine particles having an average particle size of from about 0.5 to 20 μm and a specific surface area of from about 20 to 300 m²/g.

Such fraipontite is disclosed in e.g. JP-B-4-51485, JP-B-5-44405 and JP-B-5-44406. As commercial products, "Mizcanite HP" and "Mizcanite AP", tradenames, manufactured by Mizusawa Kagaku K.K., are available. As preservative, an antifungal agent, an antibacterial agent, an anti-freezing agent and an ultraviolet absorber.

The aqueous emulsion paint of the present invention preferably has a formulation wherein the solid content is from 30 to 80 wt %, preferably from 50 to 75 wt %.

The aqueous emulsion paint of the present invention may be coated on the surface of an article to be coated with or without interposition of a primer, by a coating means such as a brush, a spray or a roller, followed by air drying or forcible drying to form a coating free from bleeding out of contaminants.

Now, the present invention will be described in further detail with reference to Examples. However, it should be understood that the present invention is by no means restricted to such specific Examples.

In the Examples, "parts" and "%" mean "parts by weight" and "% by weight" unless otherwise specified.

Preparation of Copolymer Aqueous Emulsion (1)

Into a four-necked flask equipped with a stirrer, a reflux condenser, a nitrogen supply tube and a thermometer, 375 parts of deionized water and 0.7 part of an anionic emulsifier were added, and the interior of the flask was replaced by nitrogen and maintained at 80° C. Then, 0.7 part of ammonium persulfate was added thereto, followed by stirring for 10 minutes. Then, a preemulsion (A) comprising a monomer mixture comprising 225 parts of styrene, 210 parts of methyl methacrylate, 300 parts of butyl acrylate, 7.5 parts of acrylic acid and 7.5 parts of Placsel ATFA1 (tradename, manufactured by Daicel Chemical Industry Co., Ltd., a monomer of the above formula (I) wherein R is a hydrogen atom and n is 1), and an aqueous solution comprising 375 parts of deionized water, 22.5 parts of an anionic emulsifier and 3 parts of ammonium persulfate, was dropwise added thereto over a period of 3 hours. Upon expiration of 30 minutes after completion of the dropwise addition of the preemulsion (A), 12.4 parts of a solution having 0.4 part of ammonium persulfate dissolved in 12 parts of deionized water, was dropwise added over a period of 30 minutes. After completion of the dropwise addition, the temperature was maintained at 80° C. for further two hours, and then cooled to 40° C., whereupon the pH was adjusted to about 9 with aqueous ammonia, to obtain a copolymer aqueous emulsion (1) having a solid content of 50.3%.

Preparation of Copolymer Aqueous Emulsions (2) to (7)

Copolymer aqueous emulsions (2) to (7) were prepared in the same manner as for the copolymer aqueous emulsion (1) except that the composition of the preemulsion was changed as shown in Table 1. The units of numerical values in Table 1 are parts, and Placsel ATFA2 (tradename, manufactured by Daicel Chemical Industry Co., Ltd.) is a monomer of the above formula (I) wherein R is a hydrogen atom and n is 2.

TABLE 1

| Copolymer aqueous emulsion | | (1) | (2) | (3) | (4) | (5) | (6) | (7) |
|---|---|---|---|---|---|---|---|---|
| Composition of preemulsion | | (A) | (B) | (C) | (D) | (E) | (F) | (G) |
| Deionized water | | 375 | 375 | 375 | 375 | 375 | 375 | 375 |
| Monomers | Styrene | 225 | 225 | 225 | 225 | 225 | 225 | 225 |
| | Methyl methacrylate | 210 | 210 | 195 | 180 | 210 | 217.5 | 217.5 |
| | Butyl acrylate | 300 | 300 | 300 | 300 | 300 | 300 | 300 |
| | Acrylic acid | 7.5 | 7.5 | 7.5 | 22.5 | 7.5 | 7.5 | |
| | Placsel ATFA1 | 7.5 | | 22.5 | 22.5 | | | 7.5 |
| | Placsel ATFA2 | | 7.5 | | | | | |
| | Acetoacetoxyethyl methacrylate | | | | | 7.5 | | |
| Anionic emulsifier | | 22.5 | 22.5 | 22.5 | 22.5 | 22.5 | 22.5 | 22.5 |
| Ammonium persulfate | | 3 | 3 | 3 | 3 | 3 | 3 | 3 |

Preparation of Pigment Paste

The following components were put into a stainless steel container and stirred for 30 minutes by a stirrer to obtain a pigment paste.

| Water | 90 parts |
|---|---|
| Titanium white | 140 parts |
| Calcium carbonate | 80 parts |
| Ethylene glycol | 5 parts |
| Dispersant | 3 parts |
| Defoaming agent | 2 parts |
| Thickner | 1 part |

EXAMPLE 1

To 321 parts of the above pigment paste, 170 parts of the copolymer aqueous emulsion (1), 40 parts of fraipontite ("Mizcanite HP", tradename, manufactured by Mizusawa Kagaku Kogyo K.K.) and 10 parts of clean water were mixed, followed by stirring for 20 minutes to obtain a paint.

EXAMPLES 2 to 8 AND COMPARATIVE EXAMPLES 1 to 8

Paints were prepared in the same manner as in Example 1 except that the composition was changed as shown in Table 2. As the fraipontite, "Mizcanite HP", tradename, manufactured by Mizusawa Kagaku Kogyo K.K., was used, and as active zinc white, "Active Zinc White Azo", tradename, manufactured by Seidou Kagaku Kogyo K.K., was used. As magnesium silicate, "Kyoward 600", tradename, manufactured by Kyowa Chemical Industry Co., Ltd., was used.

TABLE 2

| | | Examples | | | | | | | | Comparative Examples | | | | | | | |
|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 |
| Pigment paste | | 321 | 321 | 321 | 321 | 321 | 321 | 321 | 321 | 321 | 321 | 321 | 321 | 321 | 321 | 321 | 321 |
| Copolymer | (1) | 170 | | | | 170 | 170 | 170 | | | | | | | | | |
| aqueous | (2) | | 170 | | | | | | 170 | | | | | | | | |
| emulsion | (3) | | | 170 | | | | | | | | | | | | | |
| | (4) | | | | 170 | | | | | | | | | | | | |
| | (5) | | | | | | | | | 170 | | | | | | | |
| | (6) | | | | | | | | | | 170 | | 170 | | 170 | | 170 |
| | (7) | | | | | | | | | | | 170 | | 170 | | 170 | |
| Fraipontite | | 40 | 40 | 40 | 40 | 40 | | | | 40 | 40 | 40 | | | | | |
| Active zinc white | | | | | | | 40 | | | | | | 40 | 40 | | | |
| Magnesium silicate | | | | | | | | 40 | | | | | | | 40 | 40 | |
| Clean water | | 10 | 10 | 10 | 10 | 10 | 10 | 10 | | 10 | 10 | 10 | 10 | 10 | 10 | 10 | |
| Tests Storage stability | | ○ | ○ | ○ | ○ | ○ | ○ | ○ | ○ | Δ | X | X | X | X | ○ | ○ | ○ |
| Bleed resistance | | ◉ | ◉ | ◉ | ◉ | ◉ | ◉ | ◉ | ○ | Δ | ○ | ○ | ○ | ○ | X | X | X |
| Water resistance | | ◉ | ◉ | ◉ | ◉ | ◉ | ◉ | ◉ | ◉ | ○ | Δ | ○ | Δ | ○ | Δ | ○ | Δ |

With respect to the paints obtained in Examples 1 to 8 and Comparative Examples 1 to 8, tests were carried out by the following methods for evaluation of their performance. The results were as shown in the lower part of Table 2.

Storage Stability Test

A paint was put into a beaker and left to stand at room temperature for 30 days, whereupon the condition of the paint was evaluated by the following evaluation standards.

○: No substantial change in the viscosity was observed, and no gelation was observed.

Δ: A certain change in the viscosity was observed.

X: A remarkable change in the viscosity or gelation was observed.

Bleed Resistance Test 500 cc of deionized water was added to 50 g of tobacco leaves and left to stand at room temperature for 24 hours to obtain an extract solution of tobacco leaves. This extract solution of tobacco leaves was boiled at 80° C. under reduced pressure, and the extract solution of tobacco leaves was concentrated to not more than 200 cc. Then, deionized water was added to adjust the volume to 200 cc to obtain an extract solution of tobacco leaves for a bleeding test.

The above extract solution was coated by a 6 mill applicator on a gypsum board having a commercially Δ: Blister was observed over the entire surface.

X: The coating underwent dissolution.

As is apparent from Table 2, each of the paints of Examples 1 to 8 which are the aqueous emulsion paints of the present invention, was excellent in all of the storage stability, the bleed resistance and the water resistance. Especially, the paints of Examples 1 to 7 having a fraipontite, active zinc white and magnesium silicate incorporated, were excellent in the bleed resistance.

On the other hand, the paint of Comparative Example 1 containing a copolymer using acetoacetoxyethyl methacrylate instead of the monomer of the formula (I), was poor in the storage stability.

Further, the paints of Comparative Examples 2 to 8 containing a copolymer containing either one of the monomer of the formula (I) and the polymerizable monomer having a carboxyl group and an ethylenic double bond, were poor in either one of the storage stability and the bleed resistance.

As described in the foregoing, the aqueous emulsion paint of the present invention is cold-setting, is excellent in the storage stability even though it contains a pigment having adsorptivity to contaminants such as tobacco tar, soot, dirt from the hands, lamp black and rain drip stain, and is capable of forming a coating free from bleeding of such contaminants. available white emulsion paint coated thereon, and left to stand at room temperature for one week.

Then, a paint obtained in each Example or Comparative Example was coated twice by a 6 mill applicator and dried at room temperature for two days, whereupon the surface state of each obtained coating was visually evaluated in accordance with the following evaluation standards.

⊚: No or substantially no bleeding of the contaminant was observed.

○: Practically no problem, although slight bleeding of the contaminant was observed.

Δ: Substantial bleeding of the contaminant was observed.

X: Bleeding of the contaminant was observed over the entire surface, and the color change was remarkable.

Water Resistance Test

A paint obtained in each Example or Comparative Example was coated on a glass plate surface by a 6 mill applicator and dried for 7 days at room temperature, whereupon the coated glass plate was immersed in water for 5 days, and the state of the coating was visually evaluated in accordance with the following evaluation standards.

⊚: No abnormality was observed.

○: No practical problem, although very slight blister was observed.

What is claimed is:

1. A cold-setting aqueous emulsion paint comprising a pigment which is at least one member selected from the group consisting of fraipontite, active zinc white and magnesium silicate and an aqueous emulsion resin consisting essentially of a copolymer of (a) a polymerizable monomer of the formula (I):

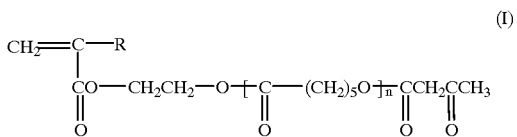

wherein R is a hydrogen atom or a methyl group, and n is 1 or 2, (b) a polymerizable monomer having a carboxyl group and an ethylenic double bond, and (c) a polymerizable monomer having an ethylenic double bond copolymerizable with the above polymerizable monomers (a) and (b).

2. A cold-setting aqueous emulsion paint comprising a pigment which is at least one member selected from the group consisting of fraipontite, active zinc white and magnesium silicate and an aqueous emulsion resin consisting essentially of a copolymer of (a) a polymerizable monomer of the formula (I):

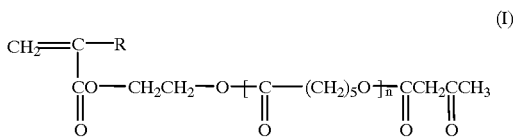

wherein R is a hydrogen atom or a methyl group, and n is 1 or 2, (b) a polymerizable monomer having a carboxyl group and an ethylenic double bond, and (c) a polymerizable monomer having an ethylenic double bond copolymerizable with the above polymerizable monomers (a) and (b), wherein the molar ratio of the polymerizable monomer (a) to the polymerizable (b) constituting the copolymer is from 0.1 to 10, and the sum of the polymerizable monomers (a) and (b) is from 0.5 to 60 wt. % of all monomers of the copolymer including polymerizable monomer (c).

3. The cold-setting aqueous emulsion paint of claim 1, wherein said polymerizable monomer (b) is acrylic acid, methacrylic acid, maleic acid, fumaric acid or itaconic acid.

4. The cold-setting aqueous emulsion paint of claim 2, wherein said polymerizable monomer (b) is acrylic acid, methacrylic acid, maleic acid, fumaric acid or itaconic acid.

5. The cold-setting aqueous emulsion paint of claim 1, wherein said polymerizable monomer (c) is $C_{1-24}$ alkyl or cycloalkyl ester of (meth)acrylic acid, a $C_{1-18}$ alkoxyalkyl ester of (meth)acrylate acid, a $C_{2-8}$ hydroxyalkyl ester of (meth)acrylic acid, an aromatic unsaturated monomer, an olefin, a diene compound, vinyl acetate, vinyl propionate, acrylonitrile, methacrylonitrile or vinyl pivalate.

6. The cold-setting aqueous emulsion paint of claim 2, wherein said polymerizable monomer (c) is $C_{1-24}$ alkyl or cycloalkyl ester of (meth)acrylic acid, a $C_{1-18}$ alkoxyalkyl ester of (meth)acrylate acid, a $C_{2-8}$ hydroxyalkyl ester of (meth)acrylic acid, an aromatic unsaturated monomer, an olefin, a diene compound, vinyl acetate, vinyl propionate, acrylonitrile, methacrylonitrile or vinyl pivalate.

7. The cold-setting aqueous emulsion paint of claim 5, wherein said $C_{1-24}$ alkyl or cycloalkyl ester of (meth)acrylic acid is methyl acrylate, ethyl acrylate, propyl acrylate, butyl acrylate, hexyl acrylate, cyclohexyl acrylate, 2-ethylhexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, hexyl methacrylate, cyclohexyl methacrylate, 2-ethylhexyl methacrylate, octyl methacrylate, lauryl methacrylate or stearyl methacrylate;

said $C_{1-18}$ alkoxyalkyl ester of (meth)acrylate acid is methoxybutyl acrylate, methoxybutyl methacrylate, methoxyethyl acrylate, methoxyethyl methacrylate, ethoxybutyl acrylate or ethoxybutyl methacrylate; said $C_{2-8}$ hydroxyalkyl ester of (meth)acrylic acid is hydroxyethyl acrylate, hydroxyethyl methacrylate, hydroxypropyl acrylate or hydroxypropyl methacrylate, hydroxypropyl acrylate or hydroxypropyl methacrylate; said aromatic unsaturated monomer is styrene, vinyl toluene, α-methyl styrene, N-vinyl pyrrolidone or vinyl pyridine; said olefin is ethylene, propylene, butylene or pentene and said diene compound is butadiene, isoprene or chloroprene.

8. The cold-setting aqueous emulsion paint of claim 6, wherein said $C_{1-24}$ alkyl or cycloalkyl ester of (meth)acrylic acid is methyl acrylate, ethyl acrylate, propyl acrylate, butyl acrylate, hexyl acrylate, cyclohexyl acrylate, 2-ethylhexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, hexyl methacrylate, cyclohexyl methacrylate, 2-ethylhexyl methacrylate, octyl methacrylate, lauryl methacrylate or stearyl methacrylate; said $C_{1-8}$ alkoxyalkyl ester of (meth)acrylate acid is methoxybutyl acrylate, methoxybutyl methacrylate, methoxyethyl acrylate, methoxyethyl methacrylate, ethoxybutyl acrylate or ethoxybutyl methacrylate; said $C_{2-8}$ hydroxyalkyl ester of (meth)acrylic acid is hydroxyethyl acrylate, hydroxyethyl methacrylate, hydroxypropyl acrylate or hydroxypropyl methacrylate, hydroxypropyl acrylate or hydroxypropyl methacrylate; said aromatic unsaturated monomer is styrene, vinyl toluene, α-methyl styrene, N-vinyl pyrrolidone or vinyl pyridine; said olefin is ethylene, propylene, butylene or pentene and said diene compound is butadiene, isoprene or chloroprene.

* * * * *